United States Patent

Wahlstrom

[15] 3,678,473

[45] July 18, 1972

[54] READ-WRITE CIRCUIT FOR CAPACITIVE MEMORY ARRAYS

[72] Inventor: Sven Wahlstrom, Palo Alto, Calif.

[73] Assignee: Shell Oil Company, New York, N.Y.

[22] Filed: June 4, 1970

[21] Appl. No.: 43,460

[52] U.S. Cl. ..........................340/173 CA, 307/238, 307/279

[51] Int. Cl. ...................................G11c 11/24, G11c 11/40

[58] Field of Search...............340/173 FF, 173 CA; 307/238, 307/279

[56] References Cited

UNITED STATES PATENTS 3,514,765 5/1970 Christensen ...........................340/173

3,550,097 12/1970 Reed.................................307/238 X 3,560,764 2/1971 McDowell et al.......................307/238

*Primary Examiner*—Malcolm A. Morrison

*Assistant Examiner*—James F. Gottman

*Attorney*—H. L. Denkler and T. E. Bieber

[57] ABSTRACT

Writing on a memory array equipped with a cross-coupled MOSFET sensing circuit operating on a race principle is facilitated by always writing a "0" but selecting the node of the cross-coupled MOSFET sensing circuit onto which the "0" is written. A low-impedance data output can be provided by driving data output line gates through a NOR gate output amplifier which also prevents switching transients from interfering with the race.

15 Claims, 6 Drawing Figures

INVENTOR
SVEN E. WAHLSTROM

Harold L. Denkler
ATTORNEY

INVENTOR.
SVEN E. WAHLSTROM
BY
Harold L. Denkler
ATTORNEY

INVENTOR.
SVEN E. WAHLSTROM
BY
Harold L. Denkler
ATTORNEY

INVENTOR.
SVEN E. WAHLSTROM
BY
Harold L Denkler
ATTORNEY

INVENTOR.
SVEN E. WAHLSTROM
BY
Harold L. Denkler
ATTORNEY

READ-WRITE CIRCUIT FOR CAPACITIVE MEMORY ARRAYS

BACKGROUND OF THE INVENTION

Copending application Ser. No. 839,720, filed July 7, 1969 and entitled SENSE AMPLIFIER FOR SINGLE DEVICE PER BIT MOSFET MEMORY discloses a sensing amplifier circuit using a pair of cross-connected MOSFETS (metal oxide silicon field effect transistors). Half of a bit line is connected to the gate electrode of one of the cross-coupled MOSFETS, and the other half of the bit line is connected to the gate electrode of the other MOSFET. This circuit takes advantage of the incremental voltage changes on the inherent bit line half capacitances when a memory cell is read to establish a race between the two cross-coupled MOSFETS. The race provides a clear readout signal regardless of the relative capacitances involved.

There are, however, two difficulties inherent in the circuit of the aforesaid application. First, it is difficult to write a "1" where a "0" has been. This is due to the considerable voltage change which has to be wrought in order to bring the side of the bit line onto which the "1" is to be written up to the level where it will win the race with the opposite side of the bit line. Secondly, the sensing amplifier of the aforementioned application is vulnerable to transients fed back into its output. Thirdly, the sensing amplifier output is of relatively high impedance and is not directly suitable, without the intermediary of an output amplifier, for use as the low impedance output to the outside world.

SUMMARY OF THE INVENTION

The invention overcomes the aforementioned problems of the circuit of the copending application by providing a logic circuit which always writes a "0"; i.e., when a "1" is to be written, the circuit automatically writes a "0" on the opposite half of the bit line, and thus accomplishes the same effect.

The circuit of this invention overcomes the transient and impedance problems by using the output of the selected sensing amplifier to drive a single cross-coupled chip output amplifier with a low impedance output.

It is therefore an object of this invention to provide a cross-coupled MOSFET sensing amplifier in which all writing is performed by writing a "0" on the appropriate side of the cross-coupled sensing amplifier, regardless of whether the write information is "0" or "1".

It is another object of the invention to provide a sensing arrangement for random access memory arrays which produces a low impedance data output and is insensitive to output transients.

DESCRIPTION OF THE PREFERRED EMBODIMENT

Figure 1:
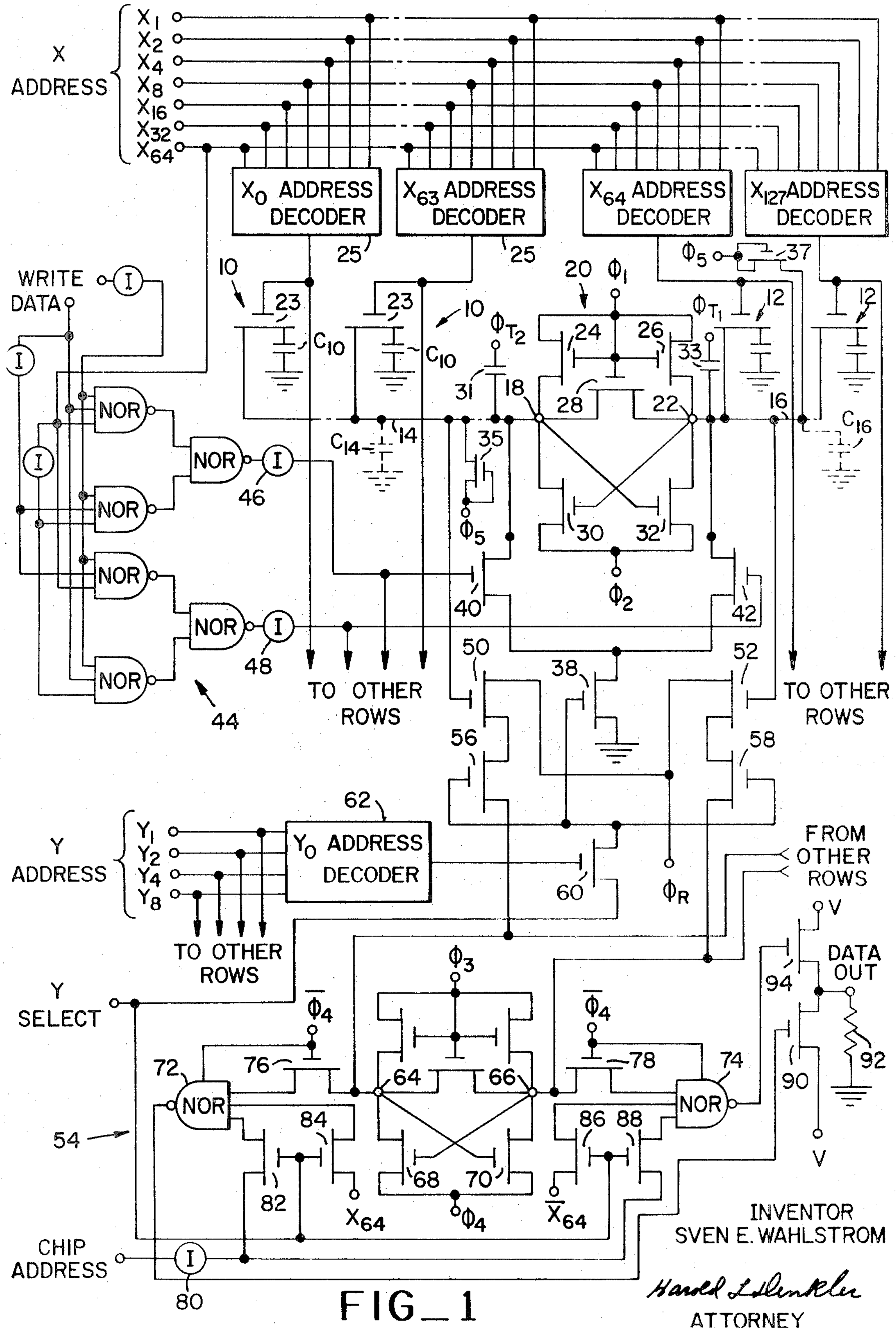
FIG. 1 is a circuit diagram of a MOSFET chip arrangement in accordance with this invention.

The circuit of the invention is best shown in FIG. 1. In that figure, the numeral 10 denotes one of a plurality of memory cells which may be of the type described in the copending applications Ser. No. 825,257, Filed May 16, 1969, and entitled SINGLE-RAIL MOSFET MEMORY WITH CAPACITIVE STORAGE; and Ser. No. 875,240, Filed Nov. 10, 1969, and entitled SINGLE-RAIL SOLID STATE MEMORY WITH CAPACITIVE STORAGE. The memory cell 10 is part of a random access memory array in which the memory cells are arranged in rows identified by a Y address and columns identified by an X address. In the embodiment of FIG. 1, an array containing 16 rows and 128 columns, i.e. 2048 bits, is suggested as a matter of example.

As a general rule, for the same number of total bits, the use of more rows and fewer columns increases the complexity of the circuit per bit (due to the need for more sensing amplifiers) but decreases the response time and improves sensitivity (due to the reduction of the bit line capacitances as compared to the memory capacitances). Particular arrangements are therefore generally chosen to represent an optimum design compromise.

In any given row, the memory cells 10 represent one-half of the total memory cells in the row. The other half of the memory cells in that row is represented in FIG. 1 by memory cells 12. It will be understood that each of the memory cells of the group represented by cells 10 and of the group represented by cells 12 is separately addressable by an appropriate X address.

The output of an addressed memory cell 10 is fed into the bit line half 14, whereas the output of an addressed memory cell 12 is fed into the bit line half 16. The bit line half 14 is connected to the node 18 of a cross-coupled sensing amplifier circuit 20. The bit line half 16, on the other hand, is connected to the node 22 of the sensing amplifier 20.

Prior to a reading operation, nodes 18 and 22 are precharged to a logic "1" level by the $\phi_1$ clock pulse which enables precharge gates 24, 26 and equalizing gate 28. The function of equalizing gate 28 is to make sure that nodes 18, 22 are precharged to exactly the same potential. The charge imparted by the precharging operation to nodes 18, 22 is retained by the bit line capacitances $C_{14}$, $C_{16}$ associated with the two bit line halves 14, 16, respectively.

Simultaneously with the $\phi_1$ pulse, a second clock pulse $\phi_2$ is applied to the source terminals of the cross-coupled MOSFETS 30, 32 of the sensing amplifier 20. The $\phi_2$ pulse blocks MOSFETS 30, 32 by eliminating any voltage difference between the gates, drains and sources of MOSFETS 30, 32 during the precharge portion of the cycle.

Concurrently with the onset of the $\phi_1$ pulse, both preconditioning inputs $\phi_{T_1}$ and $\phi_{T_2}$ are brought to a logic "1" level, thus precharging the preconditioning capacitors 31, 33.

When a given one of the memory cells, say one of memory cells 10, is now addressed at the end of the $\phi_1$ pulse by enabling the X-address gate 23 through the appropriate X decoder 25, the information stored in the memory cell capacitance $C_{10}$ is transferred to the bit line capacitance $C_{14}$. Simultaneously, the preconditioning input $\phi_{T_1}$ connected to the non-addressed bit line half 16 is returned to ground. This causes the bit line capacitance $C_{16}$ to partially discharge through preconditioning capacitor 33. The amount of discharge of bit line capacitance $C_{16}$ is determined by the logic "1" level of $\phi_{T_1}$ (or, more precisely, by the voltage difference between its "1" and "0" states), and by the capacitance of preconditioning capacitor 33. These parameters are so adjusted that the net discharge of bit line capacitance $C_{16}$ resulting from their operation is approximately one-half of the discharge caused in bit line capacitance 14 by the reading of a "0" stored in memory capacitance $C_{10}$.

As soon as the circuit has become stabilized following the end of the $\phi_1$ pulse, the situation is as follows: Designating the logic "1" level of the precharge pulse as $-V$ and the discharge of $C_{14}$ caused by the reading of a "O" as $\Delta V$, the non-addressed bit line half 16 will be at $-(V-\Delta V/2)$, and the addressed bit line half 14 will be at $-(V-\Delta V)$ (if the readout from the memory capacitance 10 was "0"), or at substantially $-V$ (if the readout was "1"). In either case, a voltage differential of $\Delta V/2$ exists between the nodes 18 and 22, the sign of the differential depending upon the information read out of the memory.

Figure 2:
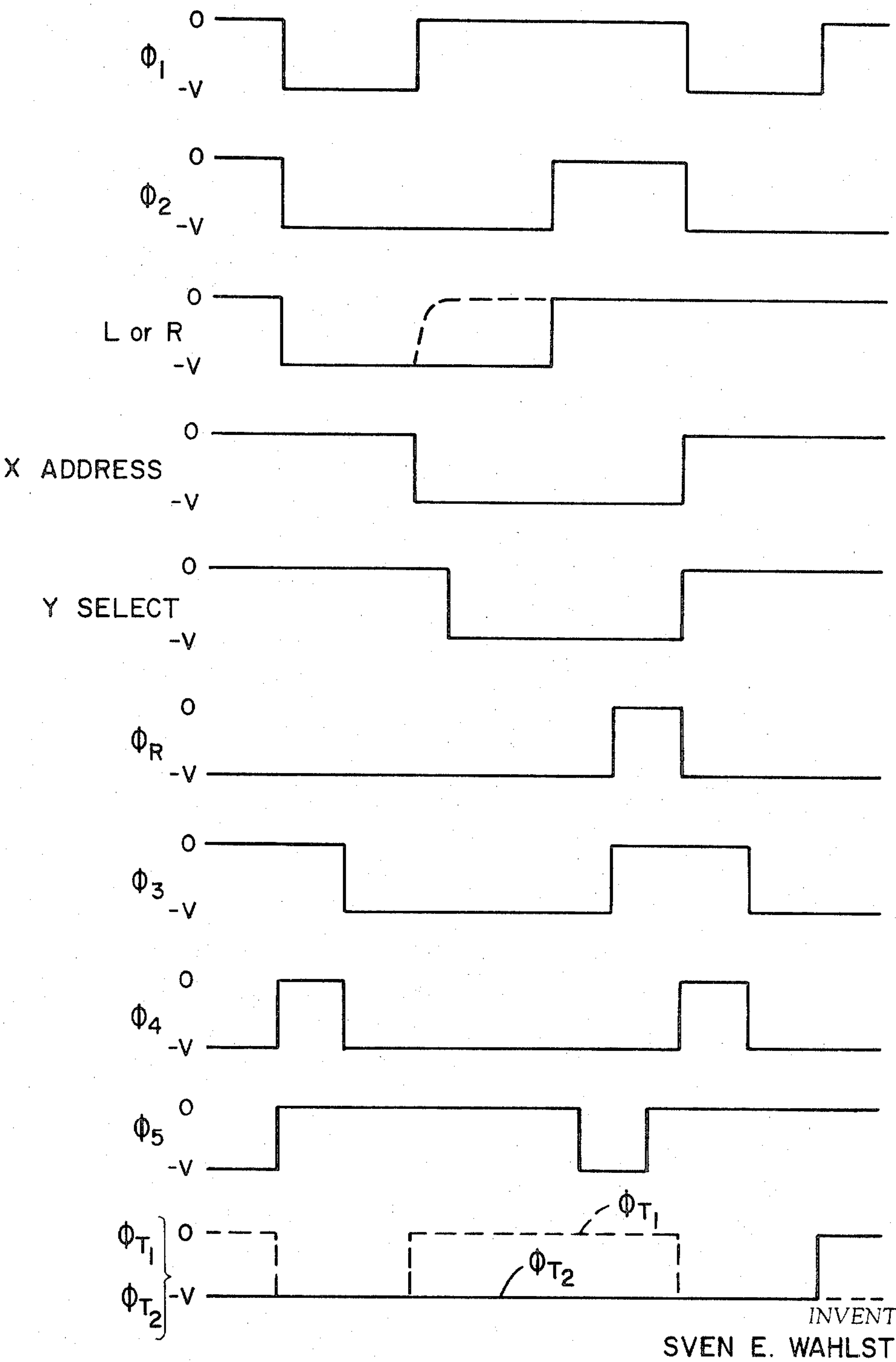
FIG. 2 is a time-amplitude diagram showing the relationship of the pulses which operate the circuit of FIG. 1.
Figure 4:
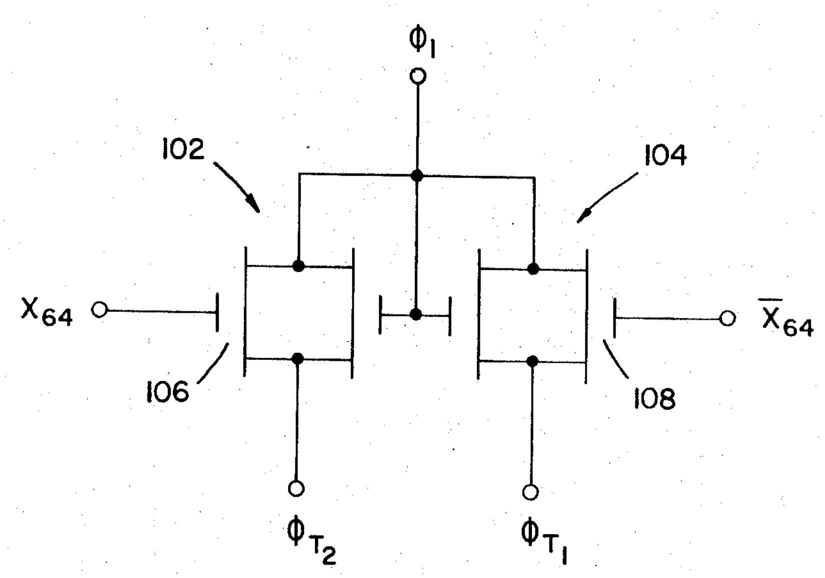
FIG. 4 is a fragmentary circuit diagram illustrating a method of generating $\phi_T$ pulses.

A convenient way of generating $\phi_{T_1}$ and $\phi_{T_2}$ is shown in FIG. 4. A pair of FARMOST (Fast Acting Ratioless Metal Oxide Silicon Transistor) inverters 102, 104 is precharged by the $\phi_1$ pulse. The control gate electrode 106 of inverter 102 is connected to $X_{64}$ (the address component common to all memory cells 12 connected to bit line half 16), whereas the control gate electrode 108 of inverter 104 is connected to $\overline{X_{64}}$ (the address component common to all memory cells 10 connected to bit line half 14). Reference to FIG. 2 will readily show that the output of inverter 102 is $\phi_{T_2}$, and that the output of inverter 104 is $\phi_{T_1}$.

Figure 5:
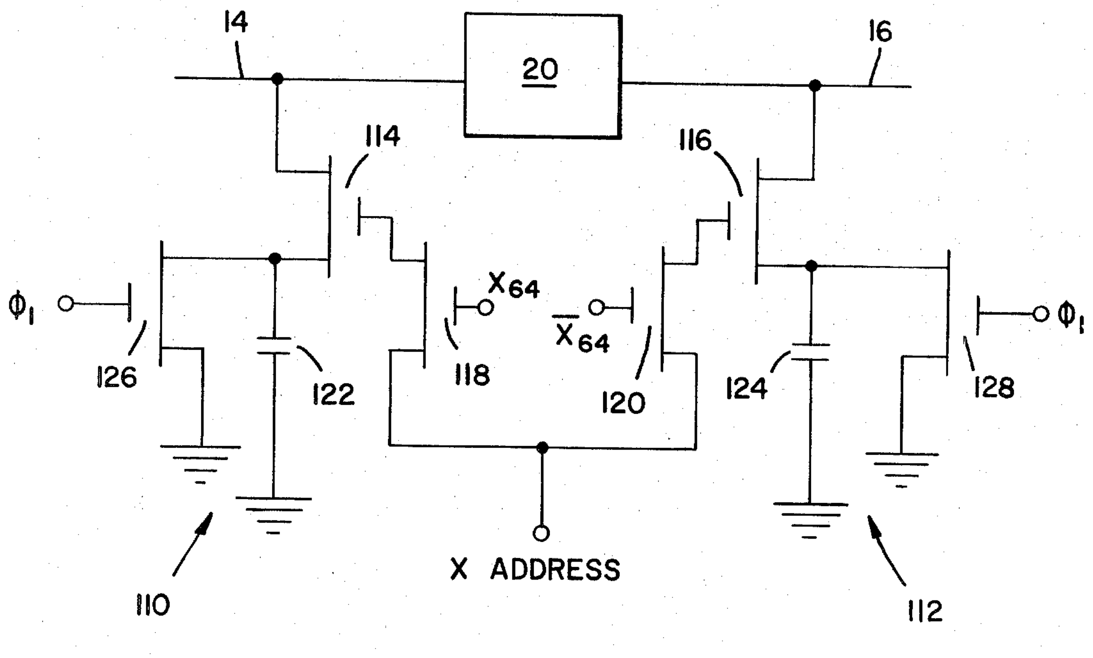
FIG. 5 is a fragmentary circuit diagram illustrating an alternative method of preconditioning the circuit of FIG. 1.

FIG. 5 shows an alternative method of performing the preconditioning operation, useful whenever the memory capacitances are returned to a full −V precharge level after reading a "1". In the arrangement of FIG. 5, the capacitors 31, 33 are replaced by a pair of preconditioning cells 110, 112 which can be connected to the bit line halves 14, 16 through preconditioning gates 114, 116 operated by the X address pulse through address gates 118, 120 respectively. Address gate 118 is enabled by $X_{64}$, whereas address gate 120 is enabled by $\overline{X_{64}}$. The preconditioning capacitances 122, 124 of cells 110, 112 each have one-half the capacitance of a single memory capacitance $C_{10}$, and they are shorted to ground through grounding gates 126, 128 respectively. The grounding gates 126, 128 are enabled by $\phi_1$.

The circuit of FIG. 5 operates as follows: During the $\phi_1$ pulse, preconditioning capacitances are brought to ground through grounding gates 126, 128. Upon the cessation of $\phi_1$ and the onset of the X address pulse, the address gate 118 or 120 on the non-addressed side of sensing amplifier 20 becomes enabled, and the preconditioning capacitance 122 or 124 on that side charges from the bit line half 14 or 16 to which it is connected. Inasmuch as preconditioning capacitance 122 or 124 is one-half the size of memory capacitance $C_{10}$, the result will be a voltage drop of $\Delta V/2$ in the non-addressed bit line half.

It will be noted that the $\phi_2$ pulse persists slightly longer than the $\phi_1$ pulse to provide the time interval necessary for the circuit to become stabilized following the information transfer and preconditioning of the nodes 18, 22 after the cessation of the precharge operation. As soon as the nodes 18, 22 have become substantially stabilized, the circuit is ready for the race operation now to be described.

Immediately upon the cessation of the $\phi_2$ pulse, a race begins between nodes 18 and 22, both of which try to discharge to ground through the cross-coupled MOSFETS 30, 32 respectively. If the information in cell 10 was "1", the higher starting voltage of node 18 causes node 18 to take longer to reach the threshold level of the gate of MOSFET 32 connected to it than node 22, starting from a lesser voltage, takes to reach the threshold level of the gate of MOSFET 30. Consequently, MOSFET 30 cuts off first, thereby preventing further discharge of node 18. Node 22, however, continues to discharge and eventually reaches the ground level of the now-grounded clock $\phi_2$. Conversely, if the information stored in cell 10 was "0", then node 18 starts discharging from a lower voltage level than node 22, and consequently MOSFET 32 will reach threshold first, thus permitting node 18 to discharge to ground while maintaining node 22 at an intermediate level.

Figure 3A:
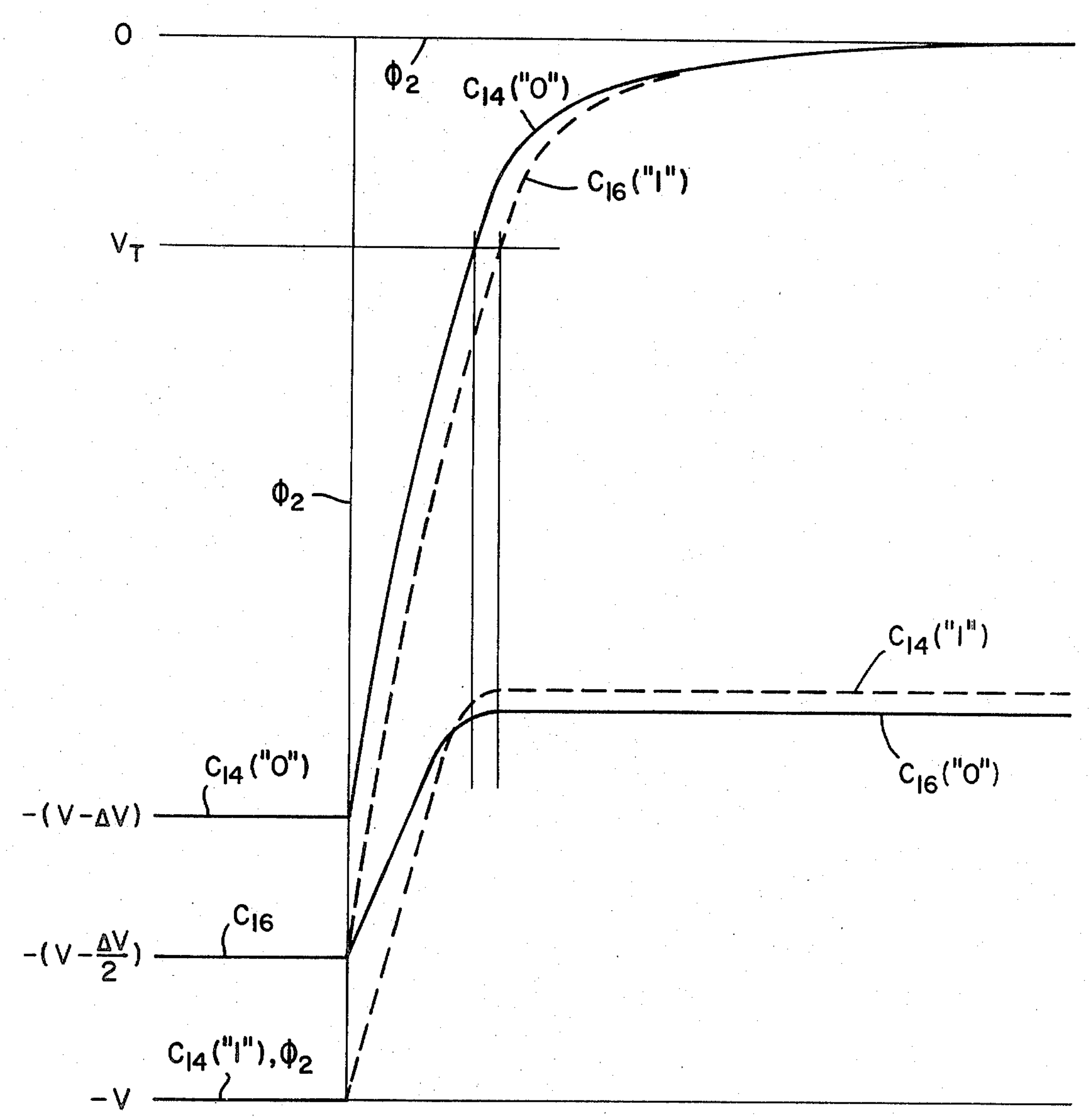
FIGS. 3*a* and 3*b* illustrate bit line voltage changes as a function of time under various race control conditions.

The foregoing description assumes a substantially instantaneous return of $\phi_2$ to ground, as shown in FIGS. 2 and 3a. While speed of operation requirements may make this necessary, the sensitivity and reliability of the circuit can be markedly improved by causing $\phi_2$ to return to ground slowly as shown in FIG. 3*b*.

FIG. 3*a* shows in exaggerated form what happens when the return time of $\phi_2$ is very short as compared to the discharge time of $C_{14}$ or $C_{16}$. In both FIGS. 3a and 3b, dotted lines indicate the reading of a "1", and full lines indicate the reading of a "0", out of memory capacitance $C_{10}$. As $\phi_2$ instantaneously returns to 0, both $C_{14}$ and $C_{16}$ start to discharge. If a "1" was read (dotted lines in FIG. 3*a*), $C_{16}$ starts from the lesser voltage $-(V - \Delta V/2)$ and is the first to reach the threshold voltage $-V_T$, at which point it blocks any further discharge of $C_{14}$. In the meanwhile, however, $C_{14}$ has had time to discharge to some degree, and its final level is substantially below the logic "1" level −V.

Figure 3B:
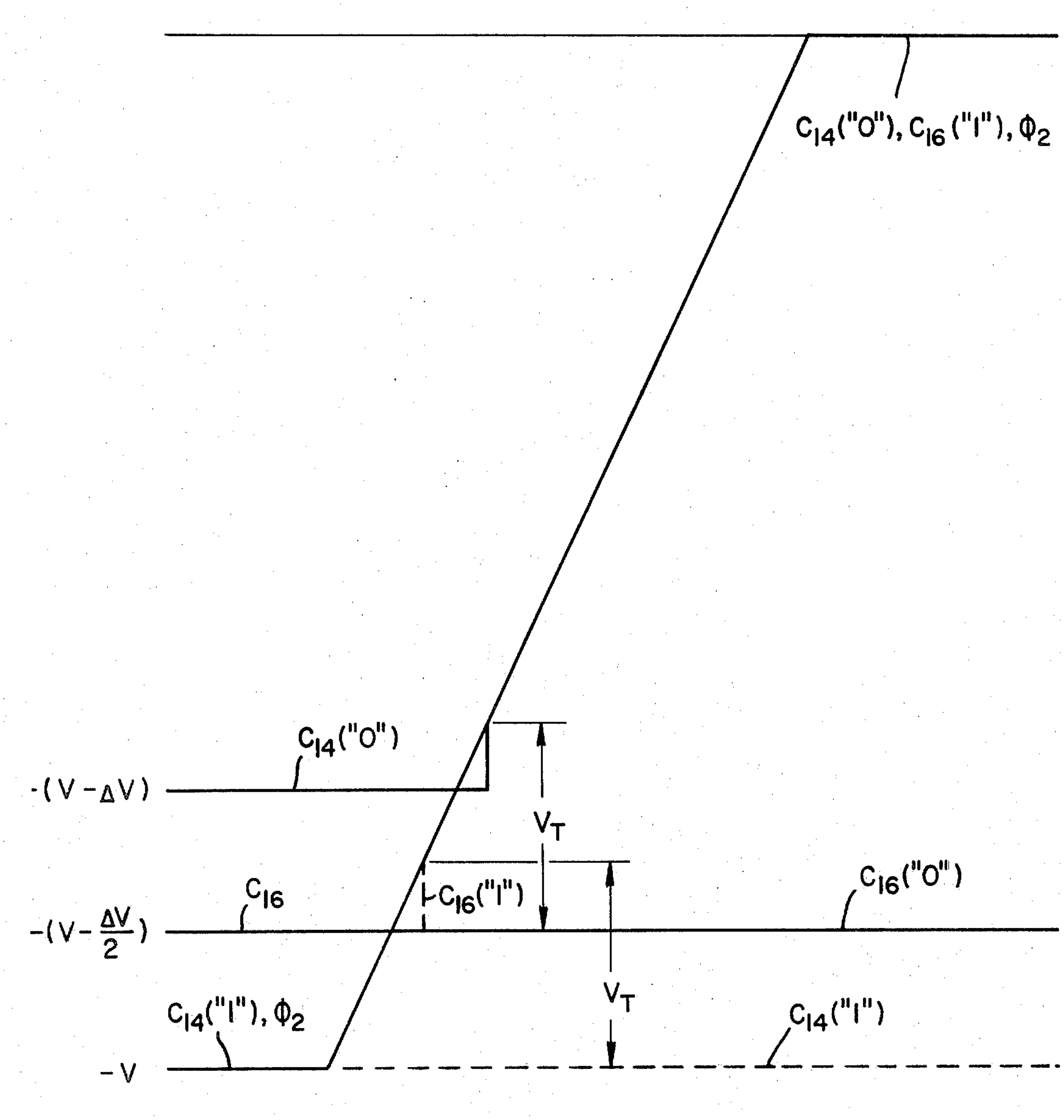

By contrast, as FIG. 3*b* shows in an exaggerated manner, a slow return time of $\phi_2$ results in a much lesser voltage loss on $C_{14}$. As $\phi_2$ slowly decreases, neither MOSFET 30 nor MOSFET 32 can conduct until the voltage differential between $\phi_2$ and $C_{14}$ exceeds the threshold voltage $V_T$. When it does, MOSFET 32 is enabled, and $C_{16}$ discharges through it rapidly enough to prevent the voltage differential between $C_{16}$ and $\phi_2$ from ever reaching $V_T$. Consequently, MOSFET 30 can never become enabled, and the initial −V level of $C_{14}$ is preserved without deterioration.

As a practical matter, a compromise between the conditions of FIGS. 3*a* and 3*b* would normally be used to obtain an optimum combination of operational speed and voltage differential between $C_{14}$ and $c_{16}$ at the end of the race.

The end of the race leaves $C_{14}$, and the memory capacitance $C_{10}$ which has been addressed, at 0 volts if a "0" was read. Hence, the reading of a "0" is nondestructive. Likewise, if a slow $\phi_2$ return as shown in FIG. 3*a* is used, the reading of a "1" would leave $C_{14}$ at its starting level of −V, and again the reading is nondestructive. In practice, however, there is likely to be a certain amount of voltage loss in $C_{14}$ when a "1" is read, as illustrated by FIG. 3*a*.

Inasmuch as $C_{10}$ is a much smaller capacitance than $C_{14}$, the loss of "1" level in $C_{10}$ does not matter, up to a point. As long as a substantial differential exists between the "1" level and the "0" level of $C_{10}$, the reading of a "1" will discharge $C_{14}$ less than the reading of a "0", and it is merely necessary to adjust the parameters of $\phi_{T_1}$ and preconditioning capacitor 33 to make the preconditioning level half way between the levels established in $C_{14}$ by the reading of a "0" and of a "1", respectively.

However, should the "1" level loss of $C_{10}$ become bothersome, it can be remedied by providing a pair of level restoring gates 35, 37 driven by a clock pulse $\phi_5$. The clock $\phi_5$ is energized after the race is essentially completed but while the X address still persists. It also returns to ground while the X address still persists.

The effect of level restorers 35, 37 is as follows: At the node which has dropped to ground, (node 18 if a "0" was read), MOSFETS 35 and 30 form a voltage divider. The respective sizes of MOSFETS 35 and 30 are such that node 18 is brought to a negative voltage level greater than ground but less than $V_T$, so that MOSFET 32 remains blocked. At node 22, on the other hand, the blocked MOSFET 32 prevents any voltage divider action, and node 22 (and, by the same token, $C_{16}$) charges back to a full −V level.

Upon the cessation of clock pulse $\phi_5$, node 18 returns to ground through MOSFET 30, and node 22 remains at −V. Conversely, if a "1" had been read, node 18 (including bit line capacitance $C_{14}$ and memory capacitance $C_{10}$) would have been brought to −V, and node 22 would have returned to ground. In this manner, full logic levels can be restored to the memory capacitance $C_{10}$ even if a substantial loss of "1" level occurs during reading.

It will be noted that if the "1" level of $\phi_5$ is made substantially greater than the "1" level of the precharge clock $\phi_1$, say twice as much, the necessity for the $\phi_T$ clocks and preconditioning capacitors 31, 33 is eliminated because the precharge level of $C_{16}$ due to $\phi_1$ is then half way between the "read 1" level and the "read 0" level of $C_{14}$. Design considerations, however, may not permit the use of sufficient voltages for $\phi_5$.

Writing is accomplished in the circuit of the invention by disturbing the unbalance of the nodes 18, 22 prior to the beginning of the race operation. At the beginning of the race, both bit line halves are at or near logic "1". Consequently, it is relatively easy to bring the higher side significantly toward logic "0", but it would be difficult to bring the lower side to logic "1".

In accordance with this invention, the difficulty is avoided by always writing a "0", and selecting the bit line half on which the "0" is to be written. For this purpose, the bit line halves 14, 16 are selectively grounded through Y address gate 38 and one or the other of write selector gates 40, 42.

Which one of the write selector gates 40, 42 is to be enabled depends both on which bit line half is being addressed, and on whether the data to be written is "1" or "0". For example, if a "0" is to be written on bit line half 14, write selector gate 40 is enabled. Likewise, if a "0" is to be written on bit line half 16, write selector gate 42 is enabled. On the other hand, if a "1" is to be written on bit line half 14, the write selector gate 42 must be enabled in order to write a "0" on bit line 16 instead. The reverse is true when it is desired to write a "1" on bit line half 16.

It will be noted that the X address of all the cells 10 does not contain an $X_{64}$ component, whereas the X address of all the cells 12 does. Consequently, the equation for the conditions under which gate 40 must be enabled can be mathematically written in Boolean terms as $$L = WRITE\,[\,X_{64}\cdot DATA + \overline{X_{64}}\cdot \overline{DATA}\,] \qquad 1$$

wherein L denotes the existence of a logic "1" signal on the gate electrode of write selector gate 40.

Conversely, the expression for the enabling of write selector gate 42 can be expressed as $$R = WRITE\,[\,X_{64}\cdot \overline{DATA} + \overline{X_{64}}\cdot DATA\,] \qquad 2$$

in which R denotes the existence of a logic "1" signal on the gate electrode of write selector gate 42.

The appropriate signal to write selector gate 40 or 42 is produced by the logic circuit generally designated as 44. An examination of the input connections to the various NOR gates making up the logic circuit 44 will show that, in accordance with the established rules of computer logic, the output of inverters 46, 48 will be the L signal and the R signal, respectively, in accordance with the Boolean formulas set out above.

If FARMOST inverters and NOR gates of the type shown in U.S. Pat. No. 3,502,908 are used for the logic circuit 44, the precharge pulse for all the logic elements of the circuit 44 is $\phi_1$.

Although the present description is concerned with a one-device-per-bit memory, the writing concept discussed above is equally applicable to a memory of identical construction but using two memory capacitors per bit of storage, one on each of the bit line halves 14 and 16. This gives, in effect, twice the amplitude of the signal permitting better margins or higher speed. In this operational mode, one cell on each half of the bit line is selected at the same time. In this case, no additional signals such as $\phi_T$ pulses need be used for unbalancing the sensing amplifier 20, as a "1" is stored by writing a "1" on one bit line half and a "0" on the other, while storing a "0" is accomplished by doing the opposite. The writing, as controlled by L and R, is accomplished by holding $X_{64} = 1$ constantly, regardless of the actual X address. The expressions for L and R are then:

$$L = Write \cdot Data$$

$$R = Write \cdot \overline{Data}$$

The $X_{64}$ and $\overline{X_{64}}$ referred to in equations (1) and (2) above must, in this case, be separated from the X address components used for decoding the actual X address. $X_{64}$ and $\overline{X_{64}}$ are both made unconditionally true, in order to always select one cell on each half of the bit line.

The sensing amplifier 20 connected directly to the bit line halves 14, 16 must, in order to operate reliably, have certain restrictions in its device area and topology.

The signal amplitude $\Delta V$ on bit line half 14 when reading a "0" out of capacitance $C_{10}$ is determined by an expression $$\Delta V = -V \cdot C_{10}(0)/C_{14}(1)$$

where $-V$ is the voltage at the bit line half 14 after precharge, $C_{14}$ (1) is the capacitance of the bit line half 14 at the precharge voltage and $C_{10}$ (0) is the capacitance of the memory capacitance $C_{10}$ at 0 volt. $C_{10}$ (0) has two components, one component which is independent of the voltage and one that decreases with increasing voltage. The latter component is the capacitance of the reversely biased PN diode formed by the source of MOSFET 23 and the substrate. The bit line capacitance $C_{14}$ (1) also has two components, with the voltage dependent component in most configurations dominating. To minimize $C_{14}$ (1), the P-area of the bit lines must be minimized.

Included in the total bit line capacitance is not only the bit line half 14 or 16 itself but also the node 18 or 22, formed by source, drain and gate overlap capacitances in devices 30 or 32, 24, 26 and 28. If the design goal is high memory capacity, that is, a large number of bits per sensing amplifier without stress on speed of operation, then the areas of the amplifier devices have to be minimized. In a typical case, a compromise is made between maximum speed and maximum capacity. For example, a chip may be designed for a total capacity of 2048 bits organized to contain 16 sensing amplifiers, each with 64 bits on each half of its bit lines. The area reserved for each sensing amplifier is approximately one-half of the area reserved for the associated 128 bits. The design goal for speed may be, in such a case, 200–300 ns cycle time.

It will be seen that the area for each sensing amplifier occupies less than 2 percent of the total working area of the chip. Any switching of the output from a selected sensing amplifier to the outside world, without intermediate amplification, would be incompatible with the impedance of the amplifier. Two difficulties present themselves: a) The switching must add a minimum of capacitance of the bit lines, in order to preserve the signal amplitude; b) The switching cannot be allowed to introduce transients that can unbalance the sense amplifier before the race is firmly established.

To cope with this difficulty, a single output amplifier 54 per chip is provided as shown in FIG. 1. By adding an output amplifier 54 to detect the state of the sensing amplifier 20 when the race has been established, no adverse effects will be fed back to the selected or to any nonselected sensing amplifier 20. MOSFETS 50, 56 and 52, 58 connecting the nodes of the sensing and output amplifiers can, in this mode of operation, be small area devices compared to the MOSFETS used in the amplifiers.

For example, a bit line capacitance $C_{14}$ of 1.5 pf can readily drive the 0.5 pf gate capacitance of MOSFET 50, whereas it would not be capable of driving the approximately 30 pf capacitance of the chip output circuit.

The output of a given sensing amplifier 20 is transferred to the output amplifier 54 by enabling the Y address gates 56, 58. The enabling of the Y address gates 56, 58, as well as of the Y address gate 38, is accomplished by enabling the Y address selection gate 60 by means of the proper Y address decoder 62 and then bringing the Y select terminal to logic "1".

The enabling of Y address gates 56, 58 connects nodes 64, 66 of the output amplifier 54 to the $\phi_R$ pulse source through sense output gates 50, 52. Normally, the read strobe $\phi_R$ is maintained at logic "1". Prior to the grounding of the read strobe $\phi_R$, the output amplifier 54 is precharged by a precharge pulse $\phi_3$ and a timing pulse $\phi_4$. The precharge operation is carried out in the same manner as was described hereinabove in connection with the precharge of sensing amplifier 20.

Following the cessation of the precharge pulse $\phi_3$, the read strobe $\phi_R$ is momentarily grounded. During that period, the gate electrode capacitances of cross-coupled MOSFETS 68, 70 discharge to ground to some degree through sense output gates 52 and 50, respectively. Inasmuch as one of the sense output gates 52, 50 is enabled and the other is not, an unbalance will occur in the potential of nodes 64, 66.

The cessation now of timing pulse $\phi_4$ initiates a race between MOSFETS 68 and 70 in the same manner as a race is initiated by the cessation of the $\phi_2$ pulse in the sensing circuit 20. The status of the nodes 64, 66 is transferred, following the cessation of the $\phi_4$ pulse, to the signal inputs of NOR circuits 72, 74, respectively, through transfer gates 76, 78. It will be then noted that consequently, when the timing pulse $\phi_4$ reappears for the next precharge of the impedance reducing circuit 54, the transfer gates 76, 78 are blocked and the NOR circuits 72, 74 produce an output dependent upon the previous condition of nodes 64, 66.

The addressing of NOR circuits 72, 74 is accomplished by the chip address inverted by inverter 80, and by the $X_{64}$ address. The chip and $X_{64}$ address information is conveyed to the other two inputs of the NOR gates 72, 74 when the Y select signal enables Y address gates 82, 84, 86, 88.

If the chip is addressed and the X address does not contain an $X_{64}$ component (as would be the case if one of the cells 10 is addressed), then the state of NOR circuit 72 is determined solely by the condition of node 64. If the signal stored on the addressed memory cell 10 was "0", the condition of node 64 will be "1" due to the inversion produced by sense output gates 50, 52. Conversely, if the information stored in the addressed memory cell 10 was "1", the condition of node 64 will be "0". In the latter condition, the NOR gate 72 will produce a "1" output and will thereby enable the data output line gate 90. Inasmuch as the output of NOR gate 72 is a full "1", the data output gate 90 will be turned on hard and will present a very low impedance.

Consequently, the reading of a "1" stored in the addressed memory cell 10 will result in the connection of the data output terminal to the $V^-$ supply. The reading of a "0" stored in the addressed memory cell 10, on the other hand, would disconnect the data output terminal from the $V^-$ supply and would ground it through load resistor 92.

As long as one of the memory cells 10 is addressed, the NOR gate 74 cannot enable the data output line gate 94 because of the presence of the $\overline{X_{64}}$ signal. Likewise, when the chip is addressed, the presence of the inverted chip address signal prevents both NOR gates 72, 74 from functioning. When, however, the chip is addressed and one of the memory cells 12 is addressed instead of one of the memory cells 10, then the presence of the $X_{64}$ component disables NOR gate 72 and instead permits NOR gate 74 to operate the data output line gate 94. The enabling of the gate 94 has the same effect on the data output as the enabling of gate 90.

The output amplifier 54 also allows greater operational speeds than other types of output amplifiers because the race results of sensing amplifier 20 can be fed to its nodes 64, 66 even before the race is established. For this purpose, $\phi_R$ may be made to start earlier than shown in FIG. 2; in fact, its onset may be almost simultaneous with the end of the $\phi_2$ pulse.

FIG. 2 shows the time relation of the various clocks and input signals which operate the circuit of FIG. 1. The dotted line in the diagram of the L or R signal denotes the "0" condition of the L or R signal, whereas the solid line indicates its "1" condition.

I claim:

1. A read-write circuit for capacitive memories, comprising:

a. a plurality of memory elements each connected to one half of a halved bit line;

b. cross-coupled sensing amplifier means arranged to operate in a race mode between the two bit line halves;

c. means for selectively impressing only a logic "0" onto one of said bit line halves in response to the occurrence of a writing signal, such means being characterized in that a logic "1" is not impressed onto either of the bit line halves by a writing signal; and d. means responsive to the address of the addressed memory element and to the logic state of the data to be written for selecting the bit line half onto which said logic "0" is to be impressed.

2. The circuit of claim 1, in which said sensing circuit means and said logic "0" impressing means consist of MOSFET circuitry.

3. The circuit of claim 1, in which said last-named means include a source of logic "0" potential, and a pair of gate means each connected between said source and one of said bit line halves, and means for enabling one of said gate means when a logic "1" is to be written and for enabling the other of said gate means when a logic "0" is to be written.

4. A sensing arrangement for capacitive MOSFET memories, comprising:

a. a plurality of individually addressable capacitive memory elements each connected to one half of a halved bit line;

b. cross-coupled, high-impedance sensing amplifier means connected to the two halves of said bit line and arranged to operate in a race mode between them so as to provide a dual-rail sensing amplifier output indicative of the information stored in the addressed memory element;

c. output amplifier means including cross-coupled MOSFET means arranged to operate in a race mode between a pair of nodes;

d. a source of read strobe pulses; and e. a pair of MOSFET switching means connecting said source of read strobe pulses to said pair of nodes;

f. said sensing amplifier output being connected to the gate electrodes of said MOSFET switching means and g. said output amplifier means being dimensioned and arranged to drive low-impedance output line gating means.

5. The arrangement of claim 4, further including low-impedance data output line means operatively connected to said output amplifier means and having gating means arranged to be selectively enabled; and means for selectively enabling said data output line gating means, said means for selectively enabling including a pair of logic elements whose output is responsive both to the logic state of one of said bit line halves, respectively, and to said $X_n$ and $\overline{X_n}$ address components, respectively.

6. The circuit of claim 5 in which said logic elements are a pair of NOR gates, each of which have one input operatively connected to one of said nodes, another input operatively connected to a source of $X_n$ or $\overline{X_n}$ signals, respectively, and an output connected to the gate electrode of one of said data output line gating means.

7. A low-impedance data output circuit for capacitive MOSFET memories having a plurality of selectively addressable memory cells, comprising:

a. a MOSFET sensing amplifier having a high-impedance, double-rail output;

b. cross-coupled output amplifier means arranged to operate in a race mode between a pair of nodes;

c. means operatively connecting each rail of said double-rail output to one of said nodes; and d. low-impedance data output line means including gating means enabled in accordance with the logic state of a selected one of said nodes.

8. The circuit of claim 7, in which said data output line gating means are enabled by a pair of logic elements whose output is responsive both to the logic state of said double-rail output and to the address of the addressed memory cell.

9. The circuit of claim 8 in which said logic elements are a pair of NOR gates whose inputs include inputs connected, respectively, to one of said nodes and to an address component of said memory cells.

10. The circuit of claim 7, in which said rail-to-node connecting means include a source of read strobe pulses and switching means operated by the output of said sensing amplifier to selectively apply said read strobe pulses to one or the other of said pair of nodes.

11. The circuit of claim 7, in which there are a plurality of sensing amplifiers, and in which said rail-to-node connecting means further include means for selectively operatively connecting the output of any selected one of said sensing amplifiers to the nodes of said output amplifier.

12. A sensing arrangement for capacitive MOSFET memories, comprising:

a. a plurality of selectively addressable memory cells each containing a memory capacitance;

b. a pair of bit line halves each associated with one-half of said plurality of memory cells and each having a bit line capacitance large as compared to said memory capacitance;

c. addressing means for connecting a selected one of said memory capacitances to the bit line half associated with it so as to produce a voltage variation therein under predetermined circumstances;

d. a sensing amplifier arranged to sense a voltage difference between said bit line halves and to produce an output representative of the sign of said difference;

e. precharge means for precharging both bit line halves to the same voltage prior to addressing one of said memory cells; and f. preconditioning means arranged to produce in one of said bit line halves a voltage variation of approximately one-half the voltage variation produced in the other bit line half by the connection of a memory capacitance thereto.

13. The arrangement of claim 12, in which said preconditioning means include a pair of sources of preconditioning pulses, means capacitively coupling each of said sources of preconditioning pulses to one of said bit line halves, and means for causing said preconditioning pulses to occur only at the source associated with the bit line half opposite the one to which the addressed memory capacitance is being connected.

14. The arrangement of claim 12, in which said preconditioning means include a pair of preconditioning cells, one on each bit line half, said preconditioning cells including a preconditioning capacitance having approximately one-half the capacitance of one of said memory capacitances, and including means for precharging said preconditioning capacitances, and means for connecting each of said preconditioning capacitances to its bit line half whenever a memory cell on the other bit line half is being addressed.

15. A level-restoring sensing amplifier arrangement for capacitive MOSFET memories, comprising:

a. a plurality of selectively addressable memory capacitances;

b. a pair of bit line halves each associated with one half of said plurality of memory capacitances and adapted to be connected to an addressed memory capacitance;

c. cross-coupled MOSFET sensing amplifier means connected to said bit line halves and arranged to operate in a race mode; and d. level-restoring means associated with said bit line halves, said level-restoring means including i. a source of level-restoring pulses; and ii. MOSFET gating means arranged to connect said source of level-restoring pulses to said bit lines, the "on" resistance of said MOSFET gating means being so related to the "on" resistance of the race MOSFETS of said sensing amplifier as to produce a below-threshold voltage on the bit line half which is at logic "0" following the race.

* * * * *